US008942295B2

(12) United States Patent
Tang et al.

(10) Patent No.: US 8,942,295 B2
(45) Date of Patent: Jan. 27, 2015

(54) METHOD AND SYSTEM FOR VERTICAL FILTERING USING WINDOW DESCRIPTORS

(75) Inventors: Chengfuh Jeffrey Tang, Saratoga, CA (US); Steven (Yao-Hua) Tseng, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 271 days.

(21) Appl. No.: 13/074,360

(22) Filed: Mar. 29, 2011

(65) Prior Publication Data

US 2011/0234618 A1 Sep. 29, 2011

Related U.S. Application Data

(63) Continuation of application No. 11/130,481, filed on May 17, 2005, now Pat. No. 7,916,795.

(51) Int. Cl.

*H04N 7/18* (2006.01)
*G09G 5/36* (2006.01)
*G09G 5/14* (2006.01)

(52) U.S. Cl.

CPC .................. *G09G 5/363* (2013.01); *G09G 5/14* (2013.01); *G09G 2320/0247* (2013.01); *G09G 2340/10* (2013.01)
USPC ................................ 375/240.29; 375/240.26

(58) Field of Classification Search

CPC .. H04N 7/50; H04N 7/26941; H04N 21/2365
See application file for complete search history.

(56) References Cited

U.S. PATENT DOCUMENTS

| | | | |
|---|---|---|---|
| 5,155,816 | A | 10/1992 | Kohn |
| 5,398,211 | A | 3/1995 | Willenz et al. |
| 5,604,514 | A | 2/1997 | Hancock |
| 5,758,177 | A | 5/1998 | Gulick et al. |
| 5,864,345 | A | 1/1999 | Wickstrom et al. |
| 5,949,439 | A | 9/1999 | Ben-Yoseph et al. |
| 5,951,664 | A | 9/1999 | Lambrecht et al. |
| 5,956,041 | A | 9/1999 | Koyamada et al. |
| 5,987,555 | A | 11/1999 | Alzien et al. |
| 6,006,303 | A | 12/1999 | Barnaby et al. |
| 6,189,064 | B1 | 2/2001 | MacInnis et al. |
| 6,411,301 | B1 | 6/2002 | Parikh et al. |
| 7,623,049 | B2 | 11/2009 | Hussain et al. |

(Continued)

OTHER PUBLICATIONS

Motorola Inc., "Scorpion" Graphics Display Generator, SDRAM Controller, and Digital Video Encoder, Product Brief, 1997, 6 pages.

(Continued)

*Primary Examiner* — Andy Rao
(74) *Attorney, Agent, or Firm* — Foley & Lardner LLP; Joseph N. Ziebert; Helen H. Zhang

(57) ABSTRACT

Herein described is a method and system of vertically filtering a graphics image such that an enhanced image is provided to a display. Filtering of the graphics image may be accomplished by using one or more window descriptors. The method may be implemented by computing a weighted average of one or more pixel intensities. The system may comprise a memory, a processor, and a graphics engine. The graphics engine may comprise a graphics blender. The graphics blender may comprise one or more multipliers and one or more adders. The processor may execute software resident in the memory, such that the one or more window descriptors may be used to compute the weighted average.

23 Claims, 7 Drawing Sheets

(56) References Cited

U.S. PATENT DOCUMENTS

| | | | | |
|---|---|---|---|---|
| 7,911,483 | B1 * | 3/2011 | MacInnis et al. ............. | 345/684 |
| 2007/0120874 | A1 * | 5/2007 | MacInnis et al. ............. | 345/634 |

OTHER PUBLICATIONS

Power TV, Inc., Graphics/Audio Media Compositor Data Sheet, Version 1.7, Feb. 27, 1997, 63 pages.

* cited by examiner

Vertical Filtering Algorithm Employed in Graphics Blender

METHOD AND SYSTEM FOR VERTICAL FILTERING USING WINDOW DESCRIPTORS

CROSS-REFERENCE TO RELATED APPLICATIONS/INCORPORATION BY REFERENCE

This Application is a continuation of U.S. application Ser. No. 11/130,481 filed on May 17, 2005, which makes reference to U.S. application Ser. No. 11/072,201entitled “LOW RESOLUTION GRAPHICS MODE SUPPORT USING WINDOW DESCRIPTORS” filed Mar. 4, 2005.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When viewing video content on a standard definition (SD) television set, a viewer may observe a visual artifact known as flicker. The flicker may be easily noticeable when the video incorporates graphics, for example. This flicker may be more easily noticed when the viewer views within a certain distance of the television set. In certain cases, the flicker may be more discernible when the intensity of the television set is increased or when the background room lighting is decreased.

When viewing television broadcasts, 480 scan lines are displayed by way of two alternating 240 line fields. The two alternating 240 line fields are interlaced to display a 480 line picture. This interlaced scanning process has provided acceptable viewing quality for viewing typical television broadcasts. However, as high resolution video content is increasingly incorporated into the television broadcasts, a viewer may detect flicker as a result of the interlaced scanning process. This occurs because of the highly defined and detailed picture quality that is characteristic of certain graphics images. Unfortunately, the presence of flicker when viewing such graphics images creates an undesirable annoyance to any viewer.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a system and method of providing vertically filtered graphics data onto a display, substantially as shown in and/or described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Figure 1:
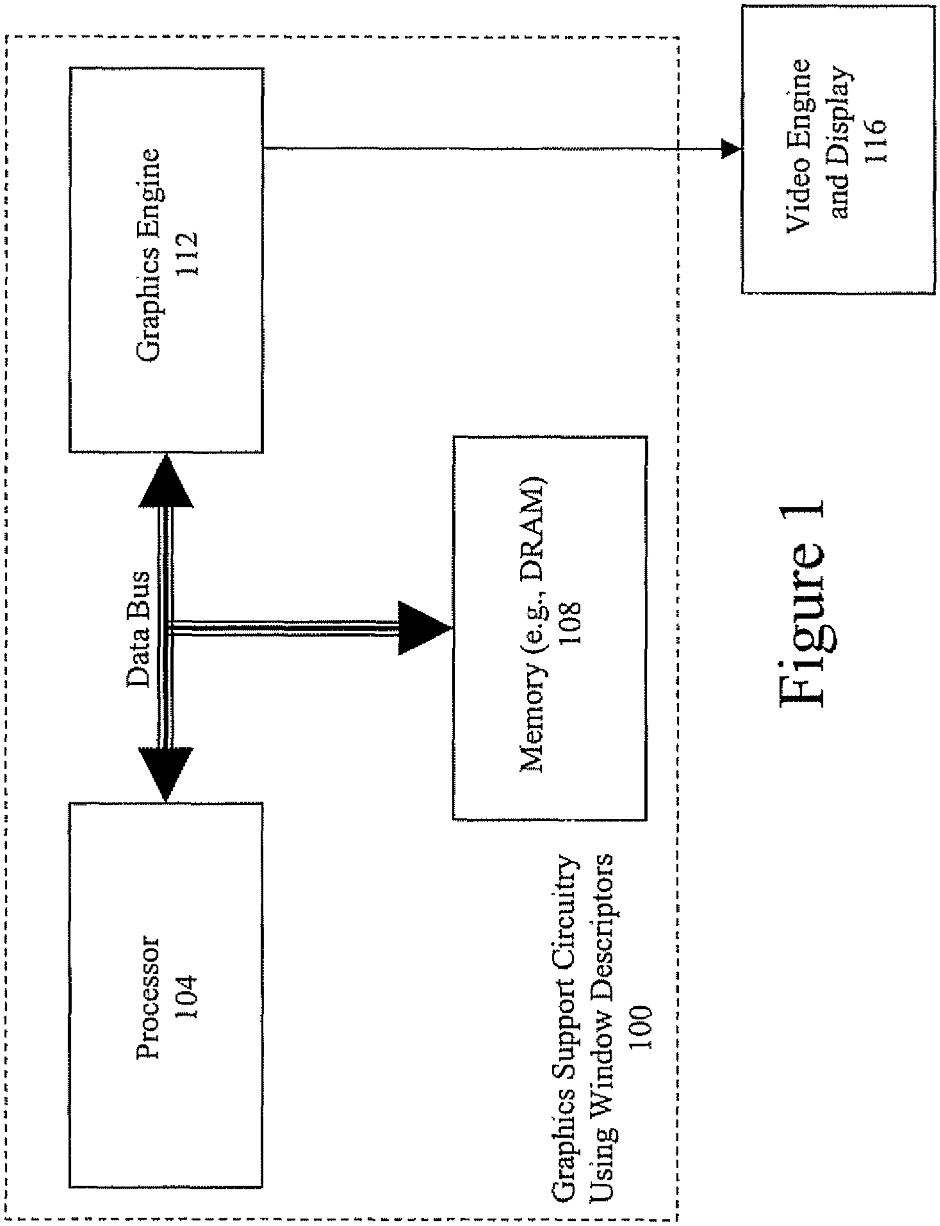
FIG. 1 is a system block diagram of the graphics support circuitry using window descriptors (GSCWD), in accordance with an embodiment of the invention.

Various aspects of the present invention provide at least a system and method for filtering a graphics image prior to displaying the graphics image onto a display. The display may comprise a monitor, television set, or set-top box, capable of displaying one or more graphics pixel surfaces or maps. The graphics pixel surfaces or maps may be used to form the graphics image. Each of the one or more surfaces or maps may be referred to as a graphics pixel surface or map since the surfaces or maps are displayed on a display using one or more pixels. The various aspects of the present invention provide vertical filtering (or anti-flutter filtering) of the graphics data, such that the graphics image is favorably displayed. The system associated with the present invention employs a simple and cost-effective way to perform the vertical filtering. Use of vertical filtering reduces noticeable flicker that occurs when a graphics image is displayed using a typical interlaced scanning process. The typical interlaced scanning process may comprise displaying alternating 240 line fields (even and odd fields). Each of the fields are interlaced to provide a 480 line interlaced picture. The field rate for this interlaced scanning process is 60 hertz.

Various aspects of the invention utilize one or more “window descriptors” for implementing the vertical filtering of the graphics image. Each of the one or more window descriptors specifies and/or describes one or more corresponding windows that correspond to the one or more graphics surfaces or maps. In a representative embodiment, each of the one or more windows spatially represents a graphics pixel map or graphics pixel surface that is used to produce the graphics image that will be displayed on a display. The one or more windows may be blended together and subsequently displayed on a television set, for example.

Processing of the graphics data may be accomplished using window descriptors that completely describe how the one or more graphics surfaces or graphics pixel maps or windows are presented on a display. A window descriptor comprises one or more parameters used to construct, compose, and/or describe (hence the term “descriptor” in “window descriptor”) a graphics surface (hence the term “windows” in “window descriptor”). A parameter of a window descriptor may be used to map one or more pixel intensities of one or more pixels onto a particular display, for example. A parameter of a window descriptor may indicate a starting pixel location or an ending pixel location for one or more pixel intensities. A parameter of a window descriptor may indicate the layer number of a particular graphics surface when one or more surfaces are used to form the video image to be displayed, for example. A parameter may determine the spacing between consecutive horizontal scan lines of a displayed graphics pixel map. More importantly, a parameter may specify a weighting factor that is used when one or more surfaces are blended together. The weighting factor may determine the degree (or acts as a measure) of translucence or the pixel intensity of an associated graphics pixel map or surface. The pixel intensity may comprise a number of color components. The pixel intensity may comprise a combination of luminance and chrominance components. A pixel intensity may be expressed using RGB or luminance/chrominance (YUV) formats, for example. Hereinafter, the term pixel intensity may alternatively refer to and/or represent color intensity expressed in terms of RGB or YUV formats. The parameter used to determine the spacing between horizontal scan lines may be defined as "pitch". The pitch may be defined as the address difference in memory between the first pixel of one horizontal scan line and the first pixel of the next horizontal scan line of a graphics pixel map or surface.

The display may have a native pixel resolution that differs from the pixel resolution provided by using the one or more graphics pixel maps. In a representative embodiment, the display has a pixel resolution that is higher than the pixel resolution of the one or more graphics pixels maps. In a representative embodiment, scaling of a graphics image is performed by way of using one or more graphics pixel maps or graphics pixel surfaces prior to performing vertical filtering of the graphics data of the graphics image. The scaling may be performed using one or more methods and systems described in reference to U.S. patent application Ser. No. 11/072,201, entitled "LOW RESOLUTION GRAPHICS MODE SUPPORT USING WINDOW DESCRIPTORS" filed Mar. 4, 2005 , the complete subject matter of which is incorporated herein by reference in its entirety. The scaling may be performed prior to performing a vertical filtering or anti-flutter filtering of the graphics data of the graphics image.

Hereinafter, the system that performs vertical filtering of graphics data will be referred to as a "graphics support circuitry using window descriptors" (GSCWD). The GSCWD may perform vertical filtering of any graphics image. Prior to performing vertical filtering, vertical and horizontal scaling may be appropriately performed by the GSCWD if the native resolution of the display device differs from the resolution of the graphics image.

FIG. 1 is a system block diagram of a graphics support circuitry using window descriptors (GSCWD), in accordance with an embodiment of the invention. The GSCWD comprises a processor 104, a memory 108, a graphics engine 112, and a video engine and display 116. As shown, the data bus acts as a medium for data communication between the components 104, 108, 112 of the GSCWD. The processor 104 may comprise a central processing unit (CPU) used for executing one or more sets of instructions stored in the memory 108. The memory 108 may comprise a random access memory such as a DRAM, for example. The graphics engine 112 functions to process graphics data by processing one or more window descriptors that are stored in the memory 108. Optionally, the graphics engine 112 may comprise on-chip memory used for processing the graphics data. The one or more sets of instructions as well as the one or more window descriptors may be stored in the memory 108. Further the graphics engine 112 may perform sorting and blending of one or more graphics surfaces or graphics pixel maps prior to presenting the graphics data into a video engine and display. The processor 104 executes one or more sets of instructions resident in the memory 108 that allow the graphics engine 112 to fetch one or more parameters of the one or more window descriptors. The graphics engine 112 may convert the graphics data into a common internal format such as YUV444, for example. It may utilize the common internal format to easily sort and blend one or more graphics pixel maps or surfaces together. The graphics engine 112 may provide scaling, vertical (anti-flutter) filtering, and/or aspect ratio conversion functions. The graphics engine 112 utilizes the one or more parameters to provide vertical or anti-flutter filtering. The filtered data is subsequently presented to the video engine and display 116. In addition to the vertical filtering, the processing performed by the graphics engine 112 may include horizontal and vertical scaling of the graphics data. The graphics engine 112 may comprise circuitry, such as digital integrated electronics, used to perform the vertical filtering. The processor 104 may be used to perform one or more arithmetic operations during the vertical filtering process. The one or more arithmetic operations may comprise addition and multiplication, for example. The processor 104 may be used by the graphics engine 112 for performing computations related to the vertical filtering of the graphics data. The memory 108 may store a value that determines whether vertical filtering is enabled or disabled. Alternatively, the value may be stored in the on-chip memory of the graphics engine 112.

Figure 2:
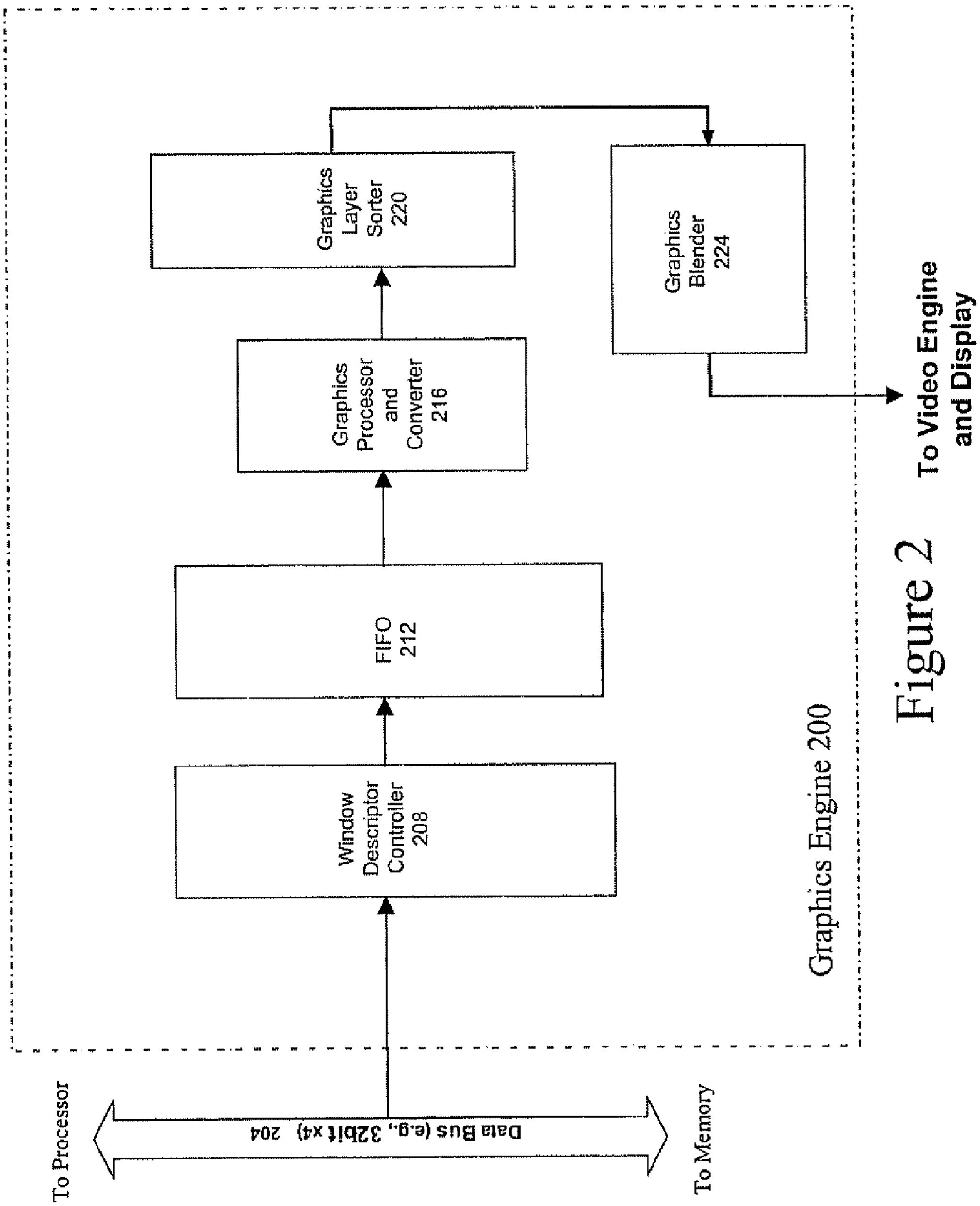
FIG. 2 is a system block diagram of a graphics engine 200 used in performing vertical filtering of graphics data, in accordance with an embodiment of the invention.

FIG. 2 is a system block diagram of a graphics engine 200 used in performing vertical filtering of graphics data, in accordance with an embodiment of the invention. The graphics engine 200 may comprise a window descriptor controller 208, a first in/first out buffer (FIFO) 212, a graphics processor and converter 216, a graphics layer sorter 220, and a graphics blender 224. As shown, the graphics engine 200 interfaces with other components (memory and processor) of the GSCWD by way of a data bus. The window descriptor controller 208 appropriately receives instructions from the processor of the GSCWD. The window descriptor controller 208 may fetch one or more parameters of a window descriptor by accessing the memory of the GSCWD. The one or more window descriptors may be used to specify or map a displayable area on a monitor or display. A graphics image (i.e., a graphics pixel map or surface) that is associated with the window descriptor may be displayed in the specified displayable area. The window descriptor controller 208 performs all graphics display controlling functions. The window descriptor controller 208 may load the one or more parameters into storage registers within the graphics engine 200. The window descriptor controller 208 may parse and sort the one or more parameters prior to transmitting them to the FIFO 212. The FIFO 212 is used for properly buffering the data prior to transmission to the graphics processor and converter 216. If required, the graphics processor and converter 216 may perform horizontal scaling and aspect ratio conversion. The graphics layer sorter 220 may properly position or layer one or more graphics pixel maps or surfaces such that one or more graphics pixel maps may overlap each other. The graphics blender 224 may blend the one or more graphics pixel maps or surfaces by weighting each surface using a weight or coefficient, and may subsequently add the weighted surfaces together to create a composite or blended surface. Various aspects of the invention allow vertical filtering of adjacent pixels of two successive or consecutive horizontal display lines (e.g., two successive horizontal lines of the 480 display lines of an exemplary 640×480 resolution monitor) by way of using the graphics blender 224. The graphics blender 224 may utilize a parameter (provided by a window descriptor) that is used as a weighting factor or coefficient. The weighting factor or coefficient may be hereinafter referred to as the variable, a ("alpha"). The weighting factor may be used to adjust a pixel intensity provided by a pixel of a graphics pixel surface, prior to displaying the pixel onto a display (such as a monitor). The pixel intensity may be expressed in terms of its chrominance and luminance channels or by way of using RGB channels, for example. One or more weighting factors may be used to blend together a number of different surfaces. In a representative embodiment, a weighted average of the intensities provided by two or more pixels is computed when performing vertical filtering. In a representative embodiment, the pixel intensities used when taking a weighted average comprises pixel intensities associated with vertically adjacent pixels in successive horizontal lines of a graphics image (i.e., The term vertically adjacent is used to refer to pixels of a displayed graphics image that are located in the same column of a display, but located in adjacent rows. The weighted average of two or more pixel intensities may be computed by multiplying the pixel intensities of each of the two or more pixels by their corresponding alpha values. The alpha values may be obtained from their corresponding window descriptors. In a representative embodiment, the alpha values that are used when computing a weighted average sum to the value 1. After a vertical filtering is performed, the graphics blender 224 outputs the vertically filtered graphics image into a video engine and display. The video engine and display may further blend the output with a background and may incorporate video data prior to displaying onto the display. As illustrated in FIG. 2, the graphics engine 200 communicates to a processor and a memory using the data bus 204. The data bus may comprise a 128 bit data bus that utilizes four 32 bit words. The graphics blender 224 may comprise one or more logic devices, such as one or more multipliers and one or more adders. The one or more multipliers and one or more adders may be used for computing the previously mentioned weighted average.

Figure 3:
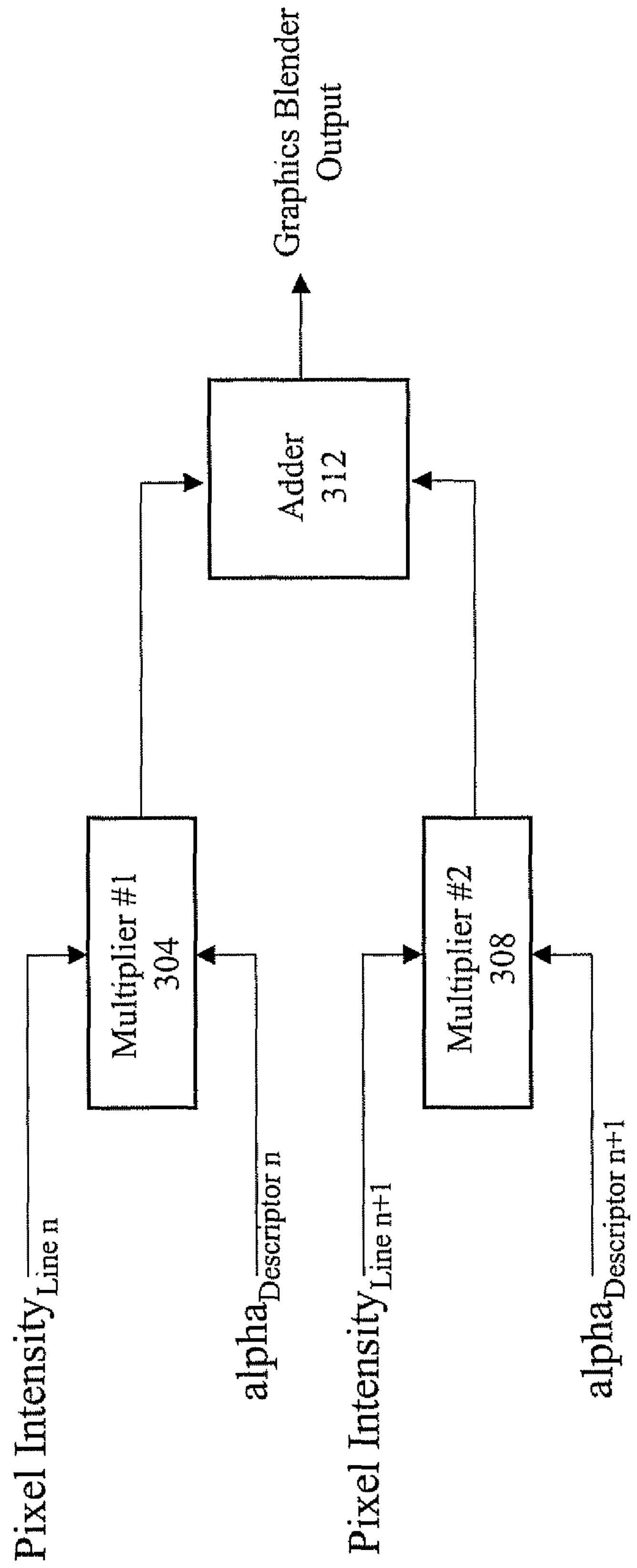
FIG. 3 is a block diagram of a system that implements a vertical filtering algorithm that is used to enhance a graphics image, in accordance with an embodiment of the invention.

FIG. 3 is a block diagram of a system that implements a vertical filtering algorithm that is used to enhance a graphics image, in accordance with an embodiment of the invention. The representative embodiment shown in FIG. 3 implements vertical filtering by computing the weighted average of the pixel intensities of two vertically adjacent pixels in a graphics image. The system comprises a first multiplier 304, a second multiplier 308, and an adder 312. A first input to the first multiplier 304 comprises a pixel intensity of a pixel from a horizontal line (i.e., nth horizontal line) of the graphics image. A second input to the first multiplier 304 comprises an alpha value provided by an nth window descriptor ($alpha_{Descriptor\ \#n}$) associated with the nth horizontal line. In this representative embodiment, each window descriptor describes or is associated with a horizontal line of the graphics image to be displayed. The first multiplier 304 outputs the product, ($Pixel\ Intensity_{Line\ \#n} \times alpha_{Descriptor\ \#n}$), to the adder 312. A first input to the second multiplier 308 comprises a pixel intensity of a pixel from a next horizontal line (i.e., (n+1)th horizontal line) of the graphics image. A second input to the second multiplier 308 comprises an alpha value provided by an (n+1)th window descriptor ($alpha_{Descriptor\ \#(n+1)}$) associated with the (n+1)th horizontal line. In other words, the nth and (n+1)th window descriptors describe successive or consecutive horizontal lines of the graphics image. In a representative embodiment, the graphics image has resolution of 640×480 pixels (i.e., 480 horizontal lines in which there are 640 pixels per line). The second multiplier 308 outputs the product, ($Pixel\ Intensity_{Line\ \#(n+1)} \times alpha_{Descriptor\ \#(n+1)}$), to the adder 312. The adder 312 sums the two inputs to yield the sum, ($Pixel\ Intensity_{Line\ \#n} \times alpha_{Descriptor\ \#n}$)+($Pixel\ Intensity_{Line\ \#(n+1)} \times alpha_{Descriptor\ \#(n+1)}$). The adder 312 provides the sum to the video engine and display. In a representative embodiment, $alpha_{Descriptor\ \#n}$ and $alpha_{descriptor\ \#(n+1)}$ are equal to the value 0.5; and as a consequence, a weighted average is computed for pixel intensities of vertically adjacent pixel pairs in two adjacent horizontal scan lines. The values for $alpha_{descriptor\ \#n}$ and $alpha_{Descriptor\ \#(n+1)}$ may be varied based on the algorithm employed. Certain aspects of the invention may require that the alpha values used sum to the value 1, when computing a weighted average of one or more pixel intensities. Although the specified embodiment illustrated in FIG. 3 provides a weighted average of two terms, the various aspects of the invention may be applied to any number of terms. When a total of Y terms are summed by the adder, it is contemplated that an algorithm that computes a weighted average will utilize alpha values that are equal to the reciprocal of Y. For example, if three pixel intensities of three vertically adjacent pixels are averaged, then alpha=⅓ for each of the window descriptors. The aforementioned multipliers 304, 308, and adder 312 may be resident in the graphics blender described in reference to FIG. 2.

Figure 4:
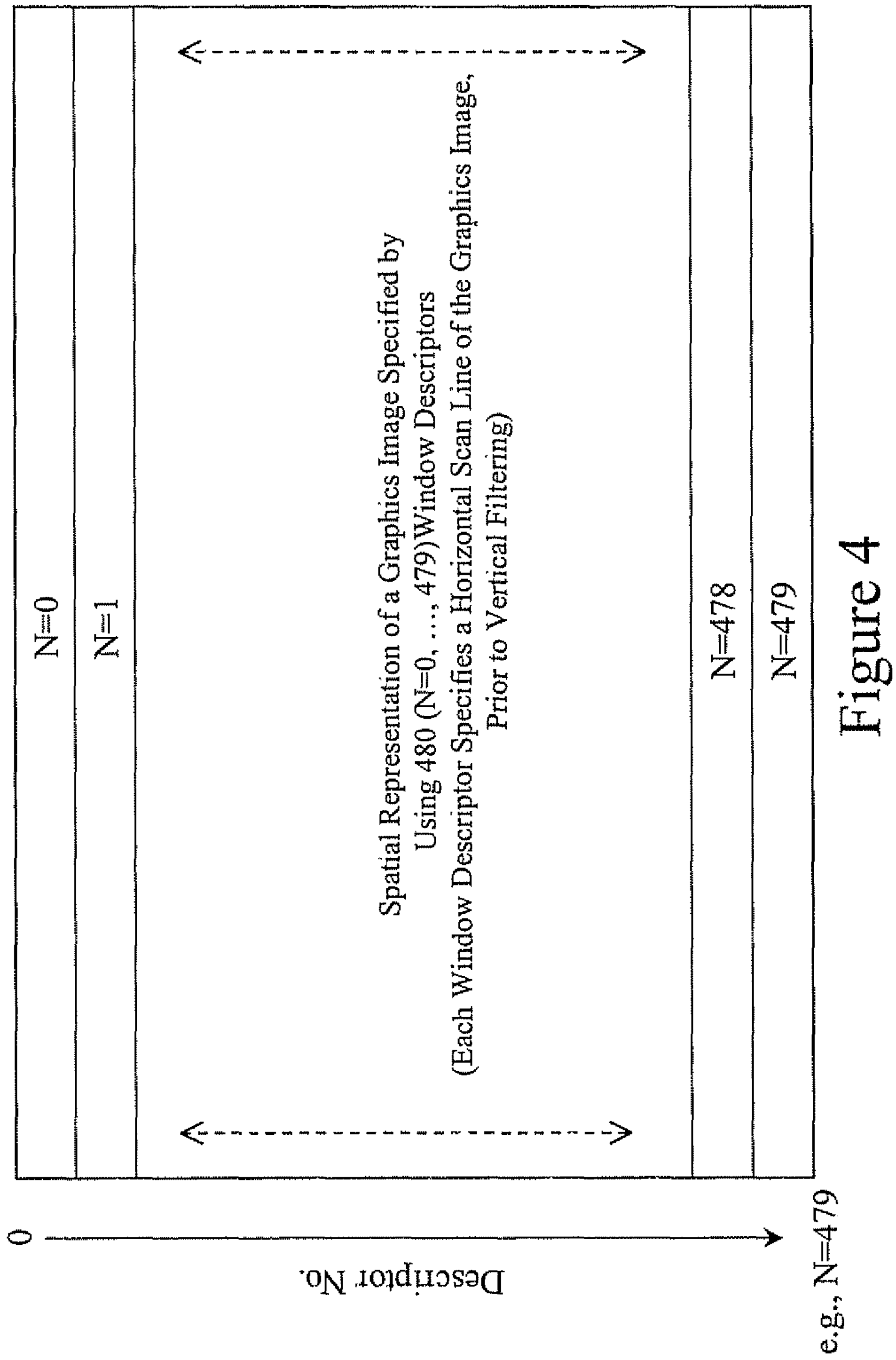
FIG. 4 is a spatial representation of a graphics image that is specified by using 480 window descriptors, in accordance with an embodiment of the invention.

FIG. 4 is a spatial representation of a graphics image that is specified by using 480 window descriptors, in accordance with an embodiment of the invention. Each of the window descriptors specifies a horizontal scan line of the graphics image. As shown, the one or more window descriptors may be used to specify the display of all horizontal scan lines during a display period. In a representative embodiment, a display period may correspond to the time it takes to display one or more fields (e.g., two fields—an odd and an even field) in an interlaced scanning process. A window descriptor provides one or more parameters (i.e., one set of parameters) used to specify and effectuate a proper display of a graphics pixel map or surface into a video engine and display, during a particular display period. The one or more parameters may comprise what was previously referred to as alpha. The variable, alpha, may be assigned a value previously described as a weighting factor or coefficient. In a representative embodiment, each window descriptor is associated with a value for alpha. The value for alpha for each window descriptor may depend on the algorithm utilized. For the embodiment shown in FIG. 3, the values for alpha may be equal to 0.5. The values for alpha may be dependent on the number of terms added together such as when a weighted average is computed. In a representative embodiment, the values for alpha may comprise the following values when using three pixels, each of which are associated with different horizontal scan lines: $alpha_{Descriptor\ \#(n-1)}=0.25$, $alpha_{Descriptor\ \#n}=0.5$, $alpha_{Descriptor\ (n+1)}=0.25$. The values may comprise any value, and in one representative embodiment, the sum of all alpha values used in the algorithm equal the value 1. The one or more parameters may comprise memory start and end addresses. A memory start or end address may refer to a pixel in a horizontal display line, for example. The memory start address may be associated with the beginning of a horizontal display line while the memory end address may be associated with a pixel at the end of a horizontal display line. The one or more parameters may comprise a layer number of a window, and may be used to order two or more windows when the two or more windows when the two or more windows are overlapped, superimposed, or added together to create a displayed image.

Figure 5:
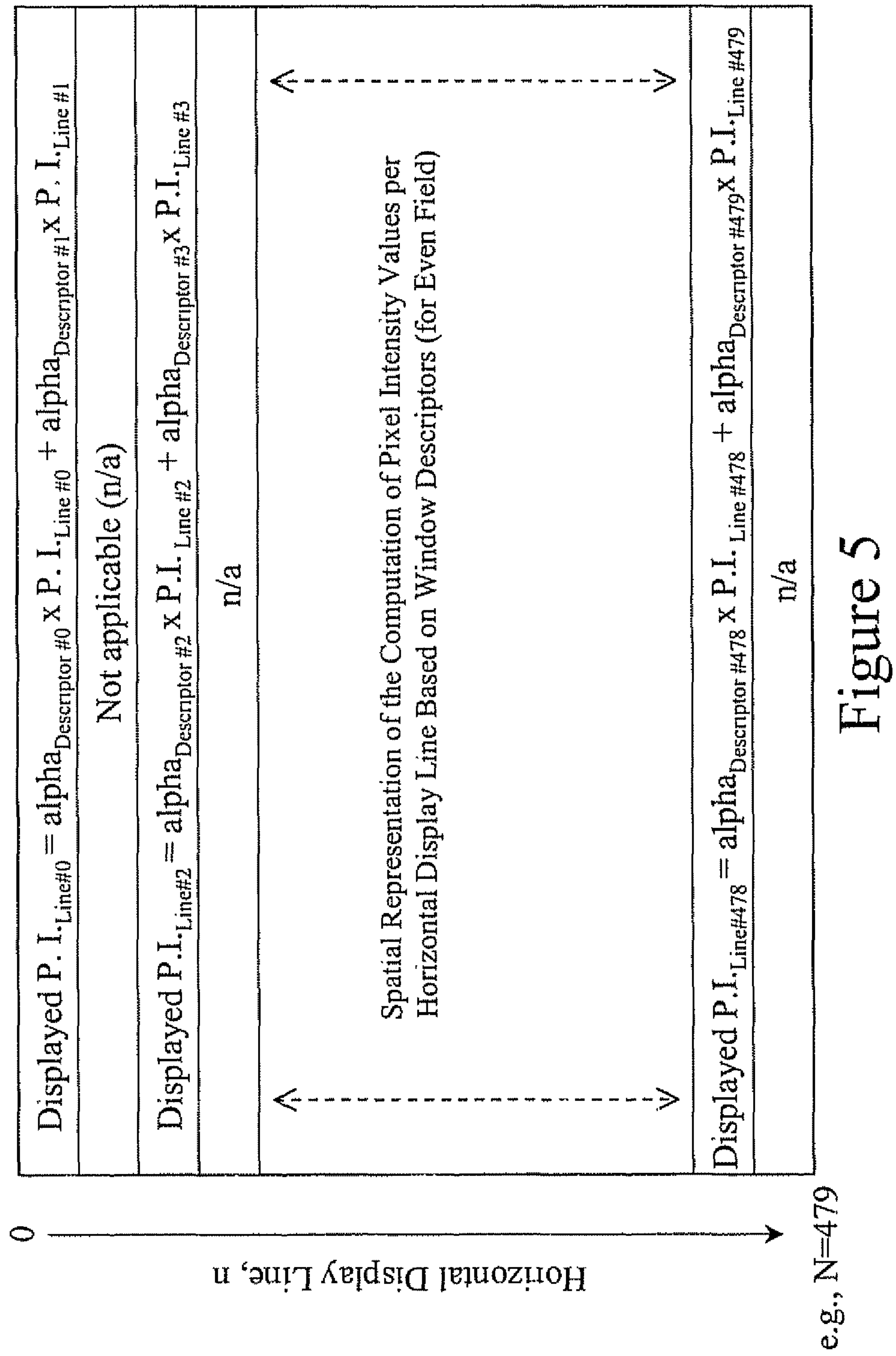
FIG. 5 is a spatial representation of one or more horizontal display lines, for an even field, that illustrates the computation of vertically filtered pixel intensities using window descriptors, in accordance with an embodiment of the invention.

FIG. 5 is a spatial representation of one or more horizontal display lines, for an even field, that illustrates the computation of vertically filtered pixel intensities using window descriptors, in accordance with an embodiment of the invention. In this representative embodiment, the vertically filtered pixel intensities are computed by using the alpha values associated with two window descriptors. In other embodiments, one or more alpha values corresponding to one or more window descriptors may be utilized. The vertically filtered pixel intensities for a displayed horizontal line are computed by adding two terms as was previously shown in reference to FIG. 3. For example, the vertically filtered pixel intensities for displayed horizontal line #0 is computed by summing two terms. The first term comprises a product of two factors: 1) alpha for window descriptor #0 and 2) the pixel intensity of a pixel at line #0. The second term comprises a product of two factors: 1) alpha for window descriptor #1 and 2) the pixel intensity of a pixel at line #1. As referenced in the embodiment shown in FIG. 4, a graphics image may be specified using 480 window descriptors. In such a representative embodiment, each window descriptor spatially corresponds to a horizontal line of the graphics image. In a representative embodiment, the alpha values are equal to 0.5, such that a weighted average of two vertically adjacent pixels of two successive lines is computed. As illustrated, the pixels associated with odd numbered display lines are not computed in this embodiment, since the field shown in FIG. 5 comprises an even field of two alternating fields (even and odd).

Figure 6:
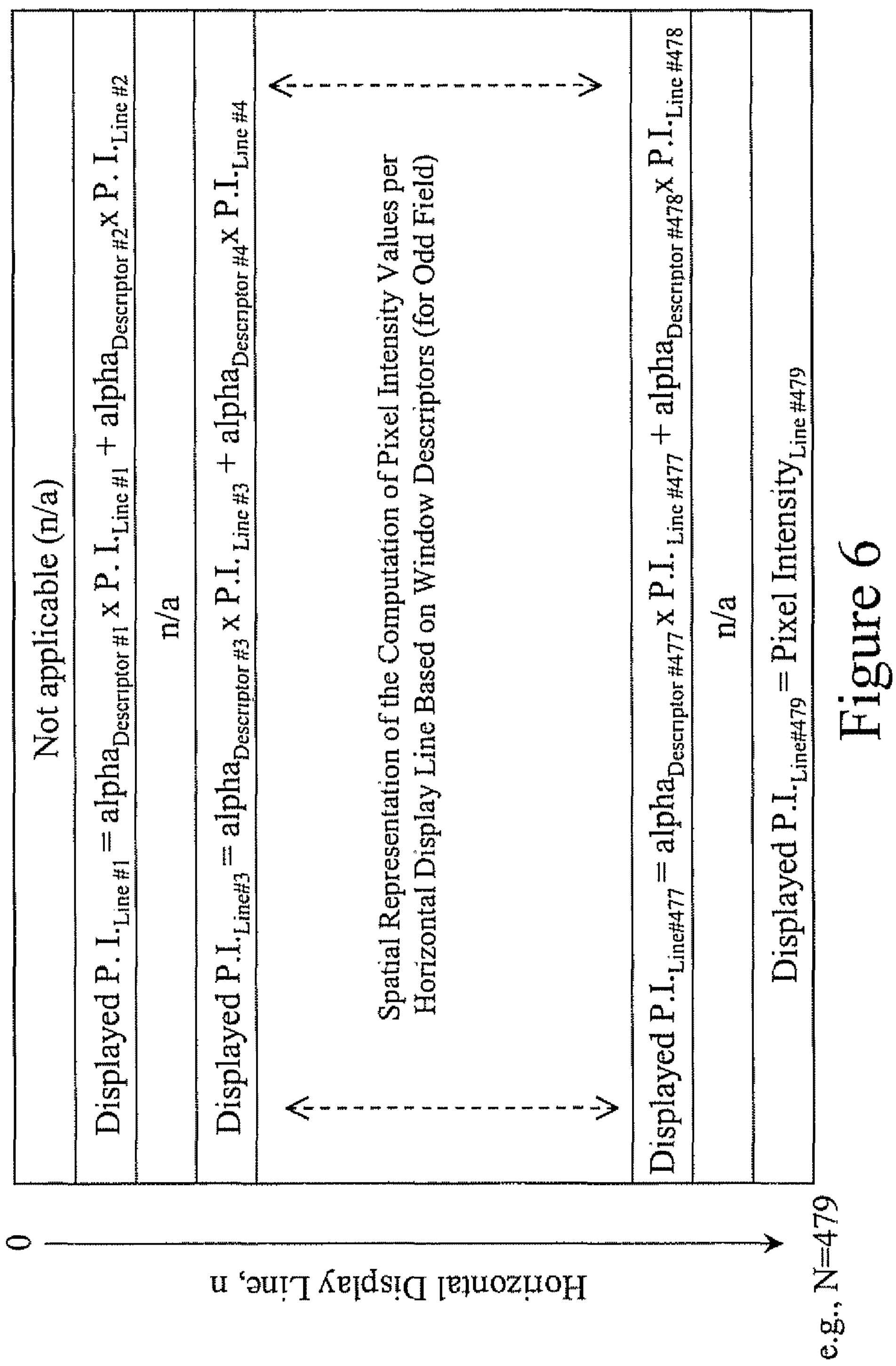
FIG. 6 is a spatial representation of one or more horizontal display lines, for an odd field, that illustrates the computation of vertically filtered pixel intensities using window descriptors, in accordance with an embodiment of the invention.

FIG. 6 is a spatial representation of one or more horizontal display lines, for an odd field, that illustrates the computation of vertically filtered pixel intensities using window descriptors, in accordance with an embodiment of the invention. Similar to what was described in FIG. 5, the vertically filtered pixel intensities are computed by using the alpha values associated with two window descriptors. In other embodiments, one or more alpha values corresponding to one or more window descriptors may be utilized. The vertically filtered pixel intensities for a displayed horizontal line are computed by adding two terms. For example, the vertically filtered pixel intensities for displayed horizontal line #1 is computed by summing two terms. The first term comprises a product of two factors: 1) alpha for window descriptor #1 and 2) the pixel intensity of a pixel at line #1. The second term comprises a product of two factors: 1) alpha for window descriptor #2 and 2) the pixel intensity of a pixel at line #2. As referenced in the embodiment shown in FIG. 4, a graphics image may be specified using 480 window descriptors. In such a representative embodiment, each window descriptor spatially corresponds to a horizontal line of the graphics image. In a representative embodiment, the alpha values are equal to 0.5, such that a weighted average of two vertically adjacent pixels of two successive lines is computed. As illustrated, the pixels associated with even numbered display lines are not computed, since the field shown in FIG. 6 comprises an odd field. Note that in this representative embodiment, the last displayed horizontal line is computed by simply using the pixel intensities of line #479. Hence, a weighted average is not computed for the last line of the odd field.

Figure 7:
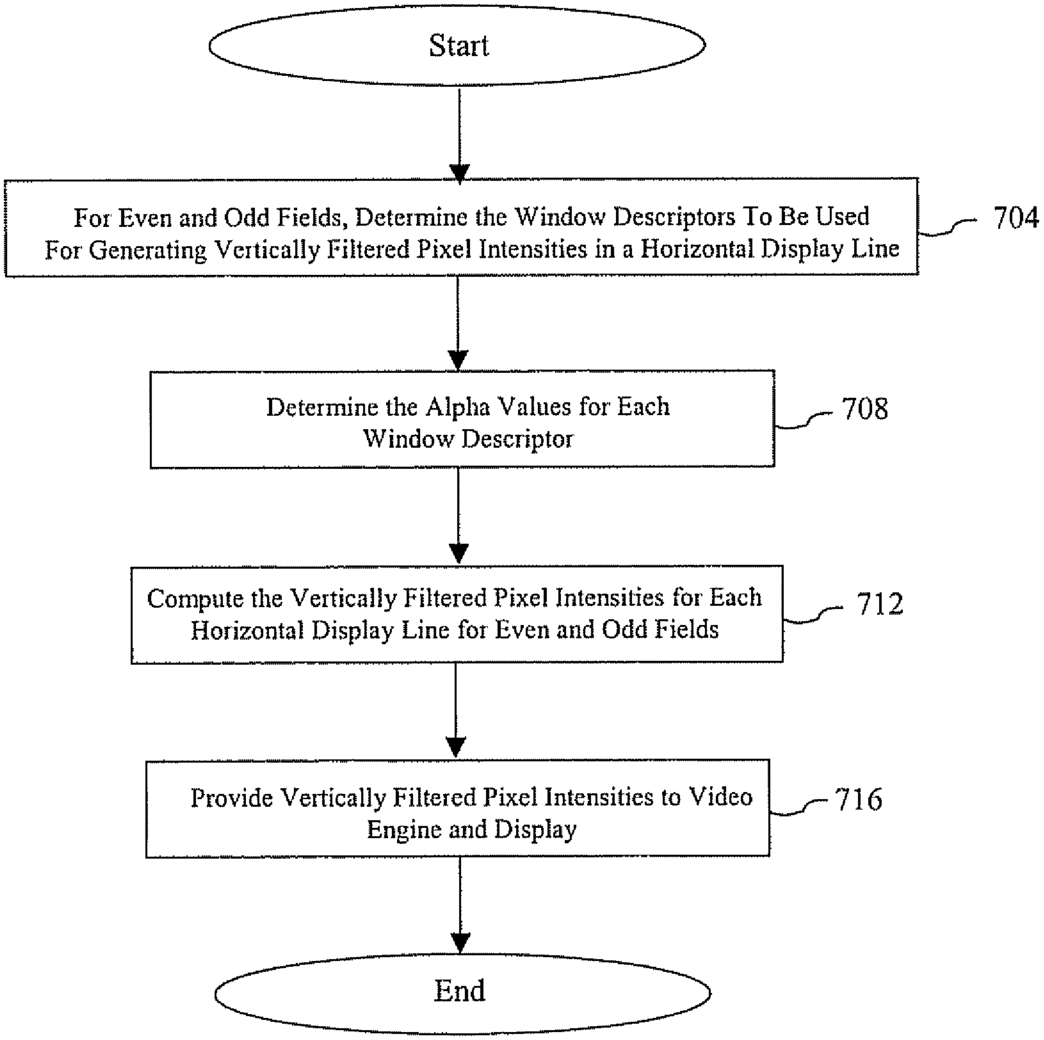
FIG. 7 is an operational flow diagram illustrating a method of implementing vertical filtering using window descriptors, in accordance with an embodiment of the invention.

FIG. 7 is an operational flow diagram illustrating a method of implementing vertical filtering using window descriptors, in accordance with an embodiment of the invention. At step 704, one or more window descriptors are selected and used for generating vertically filtered pixel intensities in a horizontal display line of an even or odd display field. One or more window descriptors may be selected and used for specifying and generating a horizontal display line in an even or odd field. Next, at step 708, alpha values for each window descriptor are determined. At step 712, vertically filtered pixel intensities are computed for each pixel of each even and odd field. The vertically filtered pixel intensities may be computed by using one or more multipliers and adders. For example, FIG. 3 illustrates an exemplary embodiment that utilizes two multipliers and one adder. Then, at step 716, the graphics engine provides the vertically filtered pixel intensities to a video engine and display. The display subsequently provides the enhanced graphics image to a viewer by way of using the vertically filtered pixel intensities.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method, comprising:

assigning, using circuitry, a first value to a first parameter of a first window descriptor for a single graphics image;

assigning, using the circuitry, a second value to a second parameter of a second window descriptor for said single graphics image;

multiplying, using the circuitry, said first value and a first pixel intensity associated with a first pixel of said first window descriptor to yield a first product;

multiplying, using the circuitry, said second value and a second pixel intensity associated with a second pixel of said second window descriptor to yield a second product; and adding, using the circuitry, said first product to said second product to yield a sum, said sum providing a vertically filtered pixel intensity for said single graphics image.

2. The method of claim 1, wherein each of said first value and said second value comprises a value that is less than 1.

3. The method of claim 1, wherein said first value and said second value sum to 1.

4. The method of claim 1, wherein said first pixel and said second pixel are vertically adjacent with respect to each other.

5. The method of claim 1, wherein said first value and said second value are fetched by way of executing a set of instructions resident in a memory.

6. The method of claim 1, wherein each of said first value and said second value equal 0.5.

7. A system, comprising:

circuitry operable to:

assign a first value to a first parameter of a first window descriptor for a graphics image, the first window descriptor being for a first interlaced scanning field;

assign a second value to a second parameter of a second window descriptor for the graphics image, the second window descriptor being for a second interlaced scanning field;

multiply said first value and a first pixel intensity associated with a first pixel of said first window descriptor to yield a first product;

multiply said second value and a second pixel intensity associated with a second pixel of said second window descriptor to yield a second product; and add said first product to said second product to yield a sum, said sum providing a vertically filtered pixel intensity for the graphics image.

8. The system of claim 7, wherein each of said first value and said second value comprises a value that is less than 1.

9. The system of claim 7, wherein said first value and said second value sum to 1.

10. The system of claim 7, wherein said first pixel and said second pixel are vertically adjacent with respect to each other.

11. The system of claim 7, wherein said first value and second value are fetched by way of executing a set of instructions resident in a memory.

12. The system of claim 7. wherein each of said first value and said second value equal 0.5.

13. A method, comprising:

associating, using circuitry, a first value with a first parameter of a first window descriptor for a single graphics image;

associating, using the circuitry, a second value with a second parameter of a second window descriptor for the single graphics image;

multiplying, using the circuitry, the first value and a first pixel intensity for a first pixel of the first window descriptor to yield a first product;

multiplying, using the circuitry, the second value and a second pixel intensity for a second pixel of the second window descriptor to yield a second product; and adding, using the circuitry, the first product to the second product to yield a vertically filtered pixel intensity for the single graphics image.

14. The method of claim 13, wherein the first window descriptor is for a first interlaced scanning field and the second window descriptor is for a second interlaced scanning field.

15. The method of claim 13, wherein the circuitry is in a graphics engine.

16. The method of claim 13, wherein the circuitry is in a graphics blender of a graphics engine.

17. The method of claim 13, wherein the first parameter specifies a weighting factor used to blend a plurality of surfaces.

18. The method of claim 17, wherein the weighting factor specifies a translucence.

19. The method of claim 13, wherein the adding is performed responsive to a value indicating whether a vertical filtering is enabled.

20. A system, comprising:

a graphics engine comprising circuitry, the circuitry operable to:

obtain a first value for a first parameter of a first window descriptor for a single graphics image;

obtain a second value for a second parameter of a second window descriptor for the single graphics image;

multiply the first value and a first pixel intensity for a first pixel of the first window descriptor to yield a first product;

multiply the second value and a second pixel intensity for a second pixel of the second window descriptor to yield a second product; and add the first product to the second product to yield a vertically filtered pixel intensity for the single graphics image.

21. The system of claim 20, wherein the first pixel is vertically adjacent to the second pixel.

22. The system of claim 20, wherein the first window descriptor is for a first interlaced scanning field.

23. The system of claim 22, wherein the second window descriptor is for a second interlaced scanning field.

* * * * *